(12) United States Patent
Hermalyn et al.

(10) Patent No.: US 11,794,782 B2
(45) Date of Patent: Oct. 24, 2023

(54) SENSOR AGGREGATION MODULE

(71) Applicant: GM Cruise Holdings, LLC, San Francisco, CA (US)

(72) Inventors: Brendan Hermalyn, San Francisco, CA (US); Radu Raduta, San Francisco, CA (US); Devin Cass, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 315 days.

(21) Appl. No.: 16/913,362

(22) Filed: Jun. 26, 2020

(65) Prior Publication Data
US 2021/0403046 A1  Dec. 30, 2021

(51) Int. Cl.
| | |
|---|---|
| *B60W 60/00* | (2020.01) |
| *G01S 17/931* | (2020.01) |
| *G01S 15/931* | (2020.01) |
| *G01S 7/481* | (2006.01) |
| *G01S 7/497* | (2006.01) |
| *G01S 7/40* | (2006.01) |
| *B60W 50/04* | (2006.01) |
| *G01S 7/02* | (2006.01) |

(52) U.S. Cl.
CPC ........ *B60W 60/0025* (2020.02); *B60W 50/04* (2013.01); *G01S 7/02* (2013.01); *G01S 7/40* (2013.01); *G01S 7/4813* (2013.01); *G01S 7/497* (2013.01); *G01S 15/931* (2013.01); *G01S 17/931* (2020.01); *B60W 2420/42* (2013.01); *B60W 2420/52* (2013.01)

(58) Field of Classification Search
CPC .... G01S 13/931; G01S 15/931; G01S 17/931; G01S 7/02; G01S 7/027; G01S 7/40; G01S 7/4813; G01S 7/497; B60W 2420/42; B60W 2420/52; B60W 50/04; B60W 60/0025
See application file for complete search history.

(56) References Cited

U.S. PATENT DOCUMENTS

| | | | |
|---|---|---|---|
| 2005/0285773 A1* | 12/2005 | Hartzstein | H01Q 1/3233 342/107 |
| 2017/0030877 A1* | 2/2017 | Miresmailli | G01D 11/30 |
| 2020/0029137 A1* | 1/2020 | Raza | H04Q 11/0066 |
| 2020/0215988 A1* | 7/2020 | Jackson | G01D 11/245 |
| 2021/0097783 A1* | 4/2021 | Soltani Bozchalooi | G05D 1/024 |
| 2021/0129625 A1* | 5/2021 | Donboli | G08B 21/24 |
| 2021/0190516 A1* | 6/2021 | Ventimiglia | G07C 5/008 |

* cited by examiner

*Primary Examiner* — Timothy X Pham
(74) *Attorney, Agent, or Firm* — Novak Druce Carroll LLP

(57) ABSTRACT

The subject disclosure relates to features for improving the modularity and interoperability of sensors and in particular, sensors deployed for use in vehicle related sensing applications. In some aspects, the disclosed technology encompasses a sensor aggregation module (e.g., sensor pod) that includes a sensor enclosure having an interior volume configured for housing one or more sensors, a data port integrated into an exterior surface of the sensor enclosure, wherein the data port is configured to be electrically coupled to a vehicle data port, and a plurality of sensor ports disposed within an interior volume of the sensor enclosure, wherein the sensor ports are configured for modular connectivity to the one or more sensors.

20 Claims, 5 Drawing Sheets

SENSOR AGGREGATION MODULE

BACKGROUND

1. Technical Field

The subject technology provides solutions for improving data transport in a switch-network and in particular, for improving transport of sensor data streams to compute nodes of an autonomous vehicle (AV).

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
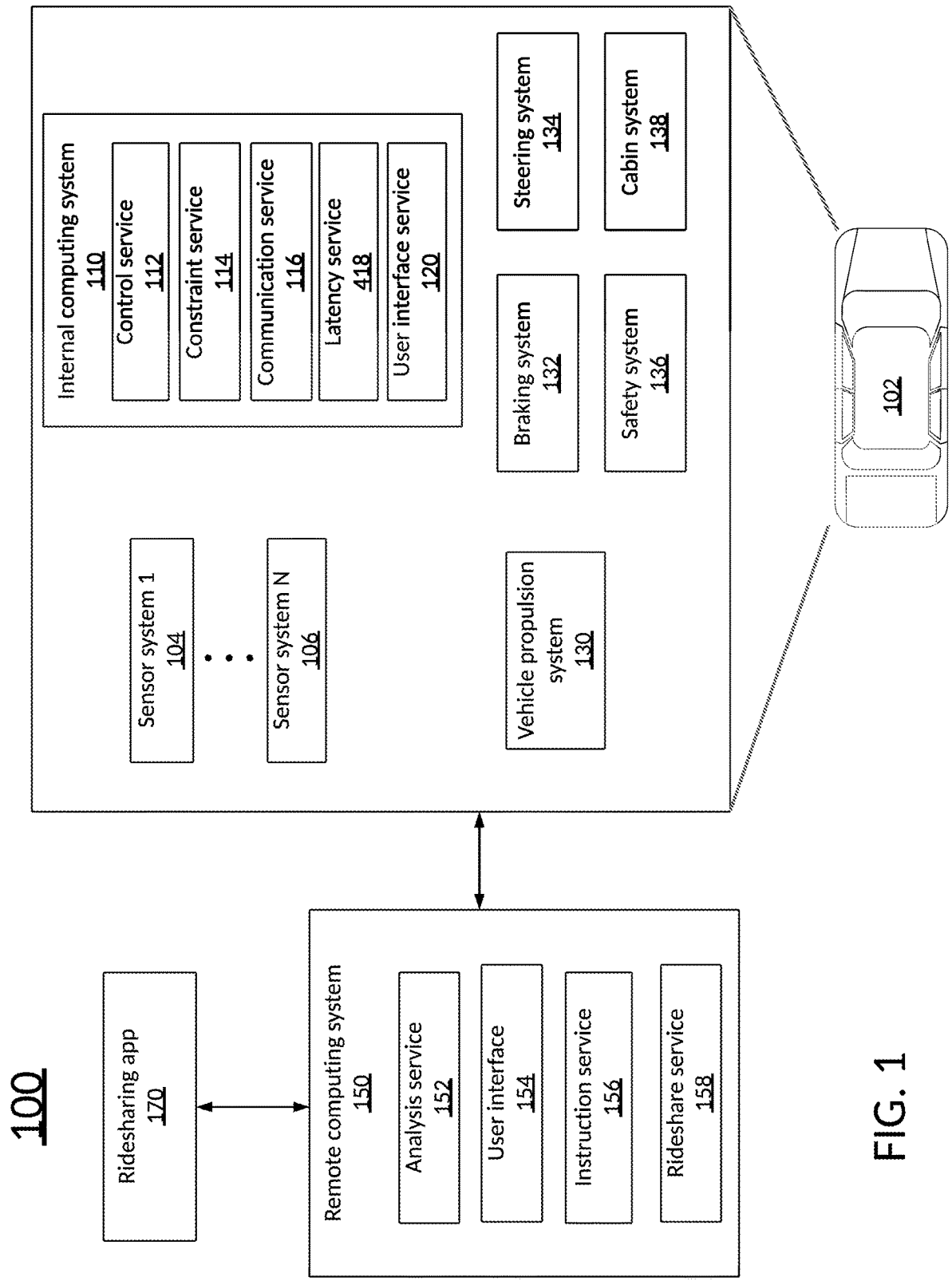
FIG. 1 illustrates an example system environment that can be used to facilitate AV navigation and routing operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Sensors and autonomous driving content for autonomous vehicles (AVs) are rapidly evolving as technology improves and becomes less expensive. The pace of sensor development is much faster than the pace at which the base vehicles are updated. When sensors and compute technologies are matched with a vehicle development timeline, those selections are often obsolete by the time the vehicle is ready for mass production. In order to have the shortest timelines for which to be using the most capable and least expensive autonomous driving technologies, the vehicle must be designed such that sensors and computing devices can be easily upgraded.

One complication to the upgrade process for autonomous vehicle (AV) sensors generally is that the various sensors on a given vehicle tend to be closely interrelated, and swapping a single sensor out for another does not necessarily constitute an upgrade. Aspects of the disclosed technology address the limitations of conventional sensor deployments by providing an aggregated sensor module (i.e., sensor pod) that permits the quick and convenient upgrade of entire sensor suites as well as provides solutions for hot-swapping single sensors in the module/pod. As used herein, the disclosed sensor aggregation module (sensor pod or pod) is an assembly of sensors and supporting components that enables decoupling of an autonomous vehicle and its sensors such that upgradeability is realized and capability enhancements and cost reduction opportunities are unlocked. As discussed in further detail below, the sensor pod can be a collection of sensors and mounting patterns that are configured to form a multi-modal, multi-field-of-view sensor aggregate. The shared packaging and internal aggregation hardware enable improved serviceability and modularity when used in AV fleet vehicles because they can be quickly replaced with functioning pods while damaged or malfunctioning pods are repaired elsewhere.

In some aspects, a sensor pod of the disclosed technology includes a sensor enclosure having an interior volume configured for housing one or more various sensors. The sensor may be of different types, including but not limited to: Light Detection and Ranging (LiDAR) sensors, cameras, radar sensors, and/or acoustic sensors, etc. As discussed in further detail below, the sensor pod can also include other modules and/or hardware that facilitates the articulation, maintenance, and/or monitoring of various sensors in the pod. In some aspects, the pod can be communicatively coupled to the vehicle (AV), via a data port that is integrated into (or attached to) an exterior surface of the enclosure. In some embodiments, the data port geometry can be standardized across vehicles/pod types, for example, so that pod/sensor upgrades are backwards-compatible with legacy vehicle builds. Similarly, various sensor ports disposed on an interior volume of the enclosure can be modular so that newer sensor versions, or altogether new sensor types can be easily added to the sensor pod.

A more detailed discussion of the various hardware modules encompassed by the sensor pod are provided in conjunction with the description of FIG. 2, below.

The disclosure now turns to FIG. 1, which illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation. Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102. Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides personal cellular (long-term evolution (LTE), 3G, 4G, 5G, etc.) communication.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc. Remote computing system 150 can, in some cases, include at least one computing system 150 as illustrated in or discussed with respect to FIG. 5, or may include at least a subset of the components illustrated in FIG. 5 or discussed with respect to computing system 150.

Figure 2:
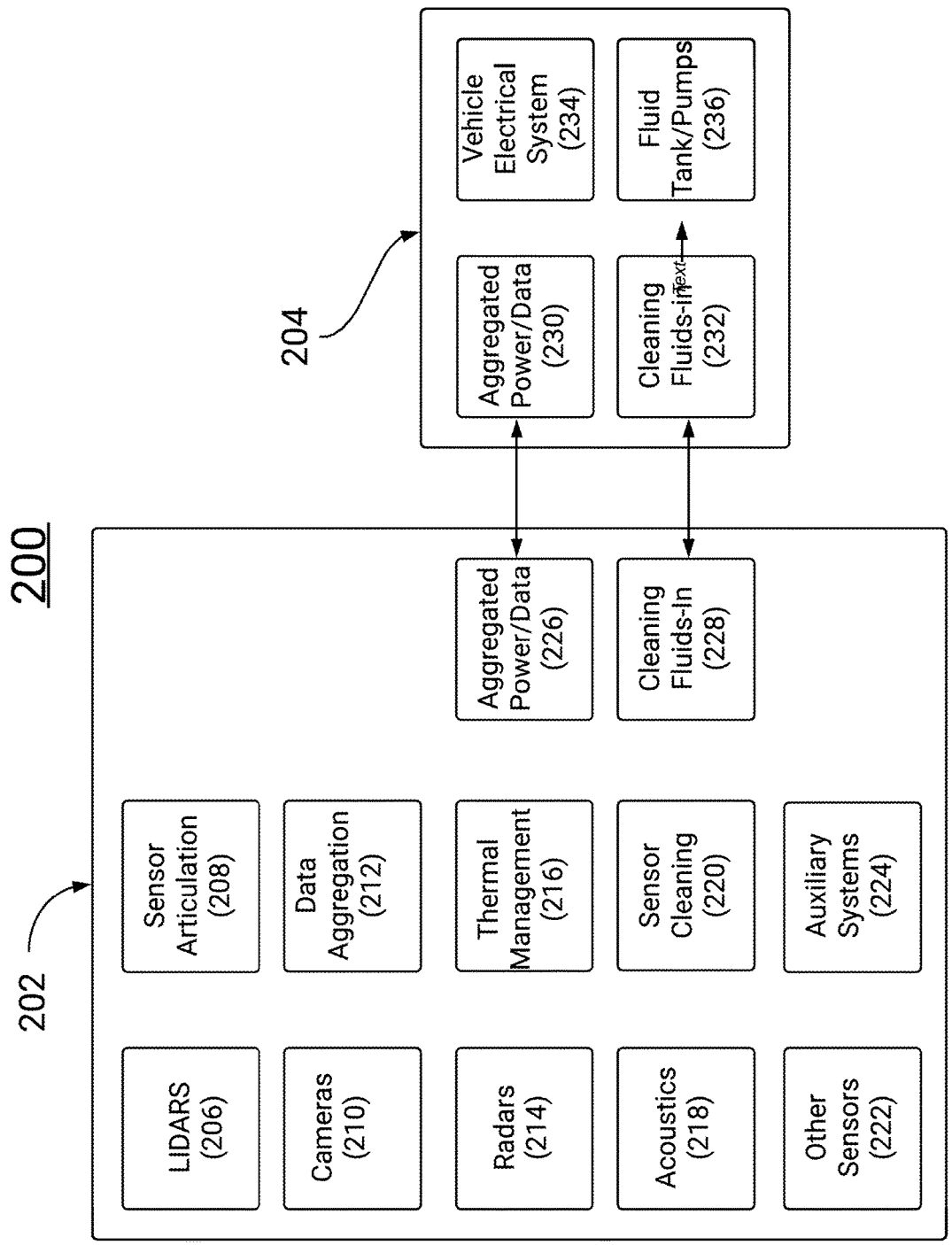
FIG. 2 illustrates an example sensor aggregation module (sensor pod), as connected to various vehicle systems, according to some aspects of the disclosed technology.

FIG. 2 illustrates an example of a vehicle-sensor pod system 200 in which a sensor pod 202 is connected to various vehicle systems 204, according to some aspects of the disclosed technology. As discussed above, sensor pod 200 can include a multitude of sensors and other various hardware modules. In some aspects, the includes sensors and hardware modules are disposed at least partially, within an interior volume of the pod enclosure. In some instances, apertures (e.g., windows) in the enclosure may be configured to allow sensor interaction with the environment surrounding the pod. For example, windows/apertures in the pod enclosure can facilitate the operation of LiDAR and/or camera sensors, that require line-of-site positioning with respect to the outside environs.

In the example of vehicle-sensor pod system 200, sensor pod 202 includes LiDAR sensors 206, sensor articulation module 208, cameras 210, a data aggregation module 212, one or more radar devices 214, a thermal management unit 216, one or more acoustic sensors (e.g., microphones) 218, a sensor cleaning module 220, and/or one or more auxiliary systems 224. Pod 202 also includes an aggregated power/data module 226, and fluids port 228. It is understood that a greater (or fewer) number of sensors, as well as sensors of different modalities may be used (e.g., other sensors 222), without departing from the scope of the disclosed technology.

Sensor operations can be supported by non-sensor hardware such as sensor articulation module 208, data aggregation module 212, thermal management unit 216, and sensor cleaning module 220, etc. For example, sensor articulation module 208 can include motors and/or controllers needed to move/pan different sensors (e.g., cameras 210). Data aggregation module 212 can perform memory queuing and data framing operations needed to prepare sensor data for transmission to the base vehicle (e.g., an AV). Thermal management unit 216 can measure temperature characteristics of different sensors and/or different locations in the pod. In some aspects, thermal management unit 216 may include head syncs, fans and/or other cooling devices needed to maintain temperature thresholds of one or more sensors or other hardware modules of in pod 202.

In practice, the various sensor modules (206, 210, 214, 218, 222) and management hardware (208, 212, 216, 220, 224) can be coupled to one or more base vehicle systems 204, for example, that reside on a vehicle, such as an autonomous vehicle. In some approaches, various hardware systems can be electrically coupled to pod 202 via standardized connectors, for example, to provide modularity between different sensors and hardware modules. Such modularity enables the ability to conveniently upgrade any sensor/hardware module in the pod, for example, as failures occur or upgrades are desired.

In some aspects, sensors and management hardware can be coupled to base vehicle systems 204 via an integrated power/data module 226. The integrated power/data module 226 can also be configured to facilitate pod modularity. For example, a plug of the aggregated power/data module 226 can be standardized such that the entire sensor pod 202 can be easily removed and reconnected to base vehicle systems 204. Similarly, mounting bracket hardware on the sensor pod and vehicle (AV) content interface, can be configured to be generic as to the vehicle interface. As such, the entire pod can be easily replaced/upgraded, without the need to reconfigure any of the individual sensors. As discussed in further detail below with respect to FIG. 3, this permits the quick and efficient replacement/upgrade of the entire sensor suite (pod), without the need to perform any changes upgrades to the base vehicle. As such, base vehicle systems 204, e.g., aggregated power/data module 230, cleaning fluids module 232, vehicle electrical system 234, and/or fluid tank/pump module 236 can remain unchanged an in continuous operation as individual sensors and/or sensor suites are interchanged and/or upgraded.

It is understood that although sensor pod 202 disclosed herein is described with respect to a vehicle/autonomous-vehicle, that sensor pod implementations are not limited to vehicles, such as AVs. For example, a sensor pod of the disclosed technology is contemplated for use in other contexts, e.g., aircraft, watercraft, and/or space applications, etc., without departing from the scope of the technology.

Figure 3:
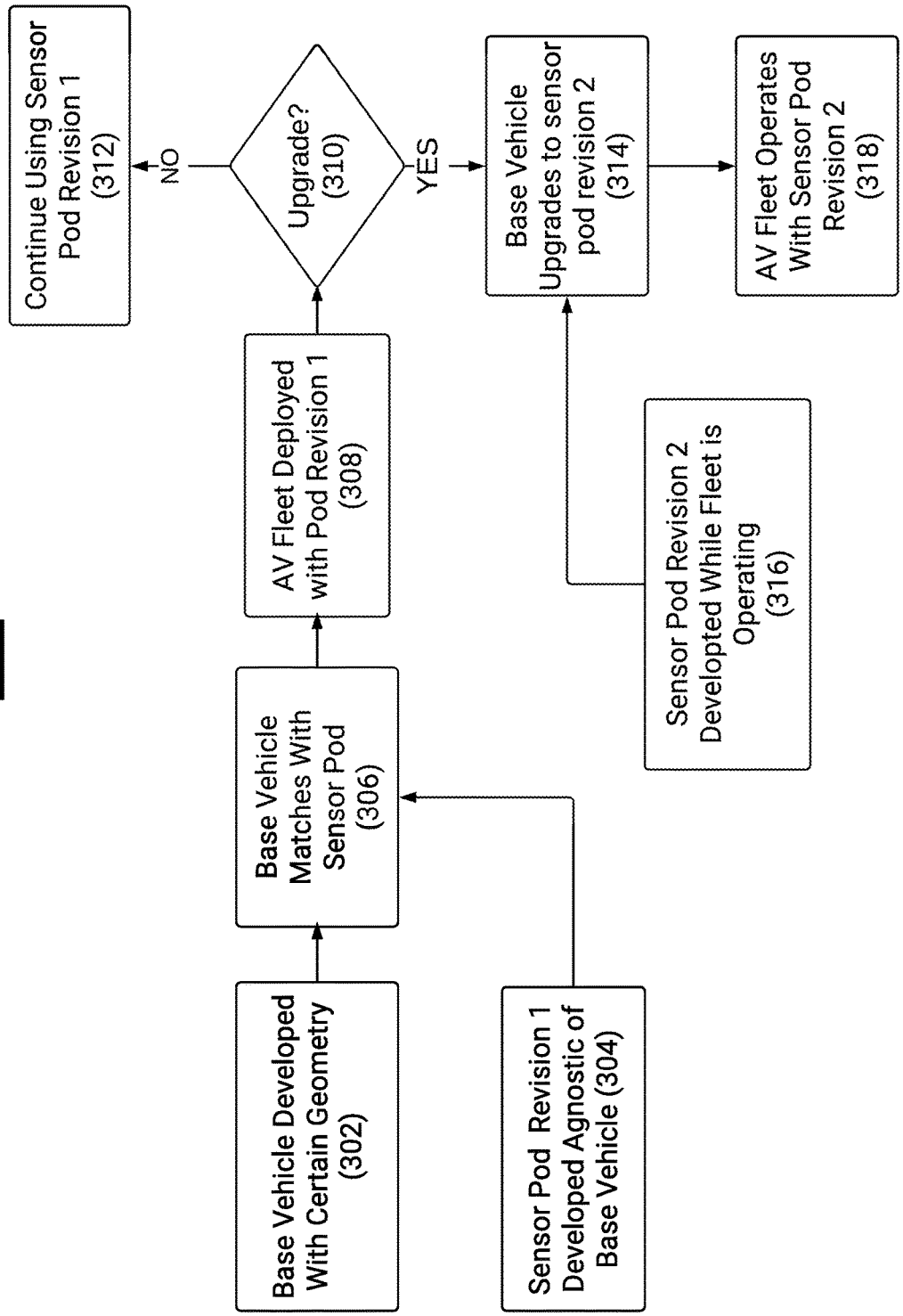
FIG. 3 illustrates an example workflow for determining the need for sensor pod updates for one or more vehicles in a fleet, according to some aspects of the disclosed technology.

FIG. 3 illustrates an example workflow 300 for determining the need for sensor pod updates for one or more vehicles, for example, in a vehicle fleet, such as an AV fleet. Workflow 300 begins with the development of one or more base vehicles with a certain geometry (302). Vehicle geometry can include characteristics of vehicle body design, as well as electrical wiring. Vehicle geometry can determine where one or more sensors and/or sensor pods are placed on or inside/around the vehicle. In some instances, a sensor pod (revision 1) can be developed concurrently with the base vehicle (304). As discussed above, design of the sensor pod can include customized mounting bracket hardware on the sensor and AV content interface, but generic to the vehicle interface for easy removal and upgrade. In some approaches, internal pod harness wiring may also be customized, for example, to interface with sensors and AV content; however, a generic vehicle interface (e.g., for power and/or data) can be used, for example, to permit future expansion.

Once development of the base vehicle (302) and sensor pod (revision 1) (304) is completed, the base vehicle is matched with the sensor pod (306). Subsequently, one or more vehicles (e.g., in an AV fleet) are deployed with sensor pod revision 1 (308). At block 310, it is determined if one or more if the fleet vehicles should be upgraded. As discussed above, upgrades can include changes/upgrades to an entire sensor pod and/or to one or more sensors in one or more different pods in operation on a given vehicle. If at block 310 it is determined that no upgrade is needed, then the one or more fleets (or entire fleet) continues in standard operation with sensor pod revision 1 (312). Alternatively, if it is determined at block 310 that upgrades are desired, then one or more base vehicles in the fleet can be upgraded to the next sensor pod version, i.e., sensor pod revision 2 (314). Similar to pod deployment in revision 1, sensor pod revision 2 can be in concurrent development while the AV fleet is in operation (316). After the upgrade, the one or more upgraded vehicles in the fleet can operate with the upgraded sensor suite provided by sensor pod revision 2 (318).

Figure 4:
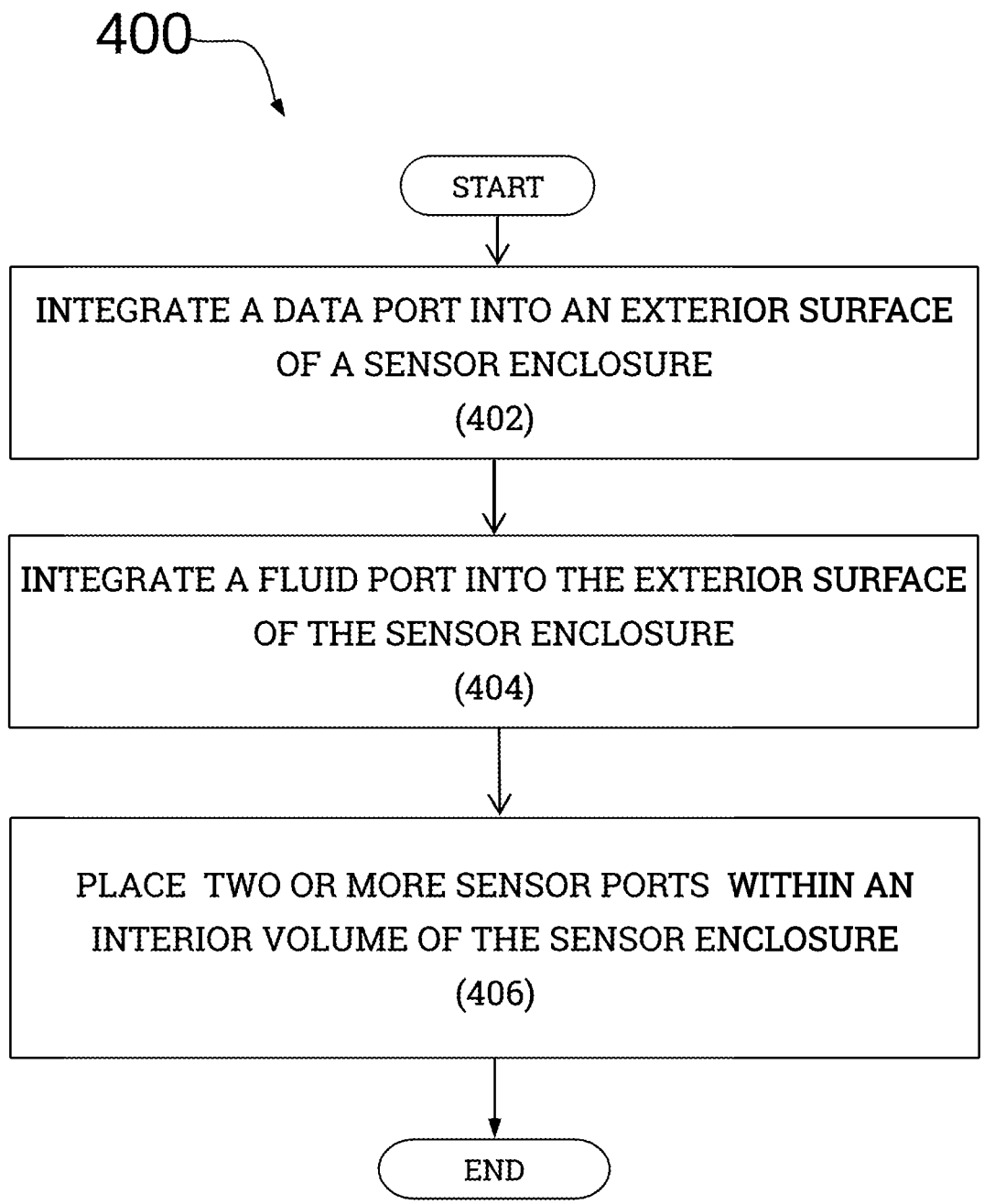
FIG. 4 illustrates steps of an example process for making a sensor pod, according to some aspects of the disclosed technology.

FIG. 4 illustrates steps of an example process 400 for making a sensor pod, according to some aspects of the disclosed technology. Process 400 begins with step 402 in which a data port is integrated into an exterior surface of a sensor (pod) enclosure. In some aspects, as illustrated in FIG. 2, the data port may also include integrated power wiring, such that data and power ports are shared by the same physical pod/AV interface. Additionally, as discussed above, the enclosure can include customized mounting bracket hardware; however, the pod can include generic vehicle interface to ensure compatibility/interchangeability with different vehicle geometries.

In step 404, a fluid port is integrated into the exterior interface of the sensor enclosure. The fluid port can be configured to exchange cleaning and/or cooling fluids, for example, with a fluid exchange system e.g., fluid tank/pump module 236, discussed above with respect to FIG. 2. As such, fluids received by the sensor pod can be used to clean and or cool one or more sensors in the pod, and/or one or more management hardware devices, e.g., 208, 212, 216, 220, 224 illustrated in FIG. 2.

In step 406, two or more sensor ports are integrated (or placed) into an interior volume of the sensor enclosure. In some aspects, the sensor ports can be configured for modularity, such that different sensor versions (and types) may be easily swapped between sensor ports.

Figure 5:
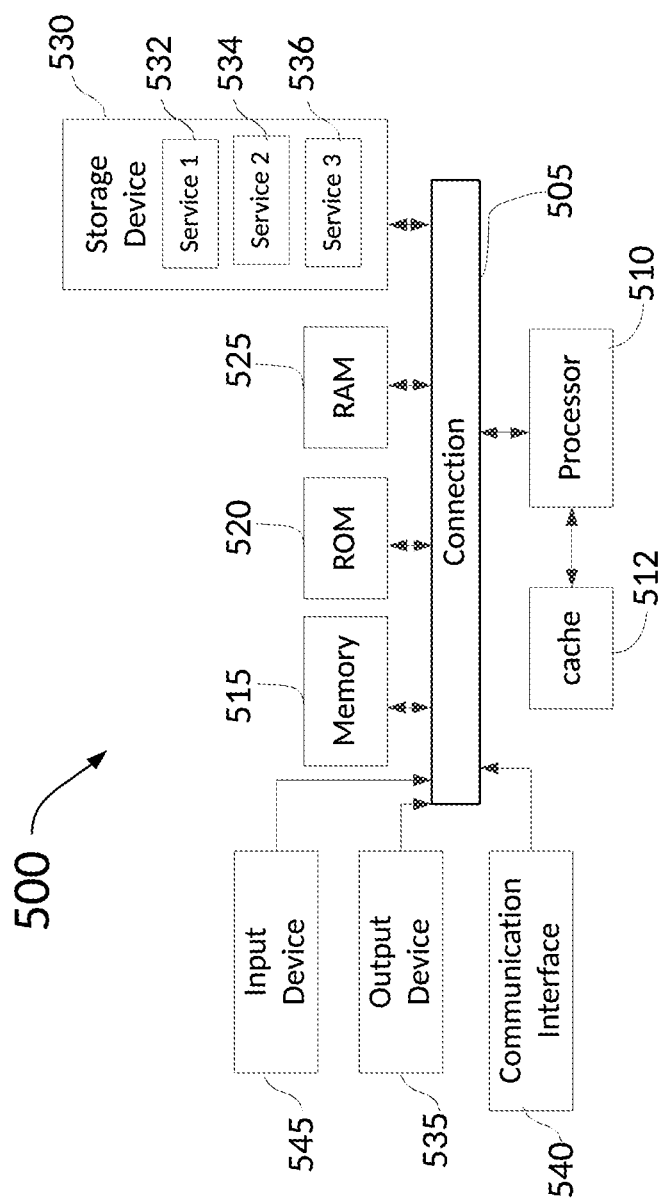
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 110, remote computing system 150, a passenger device executing the rideshare app 170, internal computing device 130, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536 for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 510 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 510 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A sensor pod comprising:
a sensor enclosure comprising an interior volume housing a plurality of sensors;
an aggregated power and data interface integrated into an exterior surface of the sensor enclosure, wherein the aggregated power and data interface is configured to electrically couple the plurality of sensors to an electrical system of a vehicle, and wherein the aggregated power and data interface comprises a data port that includes integrated power wiring; and
a plurality of sensor ports configured to connect the plurality of sensors to the aggregated power and data interface, the plurality of sensor ports configured to provide modular connectivity to the plurality of sensors such that each sensor within the sensor enclosure is removable and able to be decoupled from the plurality of sensor ports, the plurality of sensor ports being configured to enable different types or versions of sensors to be swapped between sensor ports.

2. The sensor pod of claim 1, further comprising:
a data aggregation component configured to receive sensor data from the plurality of sensors and perform one or more operations on the sensor data, the one or more operations comprising at least one of memory queuing and a data framing operation.

3. The sensor pod of claim 1, further comprising:
a fluid port integrated into the exterior surface of the sensor enclosure, wherein the fluid port is configured to be coupled to a fluid port of the vehicle to facilitate an exchange of at least one of a cooling fluid or a cleaning fluid.

4. The sensor pod of claim 1, further comprising:
a thermal management module coupled to the plurality of sensors, wherein the thermal management module is configured to provide data to the vehicle regarding a health status of at least one of the plurality of sensors.

5. The sensor pod of claim 1, wherein the vehicle comprises an autonomous vehicle (AV).

6. The sensor pod of claim 1, wherein the plurality of sensors comprises at least one of a Light Ranging and Detection (LiDAR) sensor, a radio detection and ranging (RADAR) sensor, an acoustic sensor, and a camera.

7. The sensor pod of claim 1, further comprising a sensor articulation component comprising a motor configured to move at least one sensor of the plurality of sensors.

8. The sensor pod of claim 1, further comprising:
a data aggregation component configured to receive sensor data from the plurality of sensors, process the sensor data, and send the processed sensor data to a computer of the vehicle.

9. An autonomous vehicle (AV) comprising:
a sensor pod comprising:
- a sensor enclosure with an interior volume housing a plurality of sensors;
- an aggregated power and data interface integrated into an exterior surface of the sensor enclosure, wherein the aggregated power and data interface is configured to electrically couple the plurality of sensors to an electrical system of a vehicle, and wherein the aggregated power and data interface comprises a data port that includes integrated power wiring; and
- a plurality of sensor ports configured to connect the plurality of sensors to the aggregated power and data interface, the plurality of sensor ports configured to provide modular connectivity to the plurality of sensors such that each sensor within the sensor enclosure is removable and able to be decoupled from the plurality of sensor ports, the plurality of sensor ports being configured to enable different types or versions of sensors to be swapped between sensor ports.

10. The AV of claim 9, wherein the sensor pod further comprises:
- a data aggregation component configured to receive sensor data from the plurality of sensors and perform one or more operations on the sensor data, the one or more operations comprising at least one of memory queuing and a data framing operation.

11. The AV of claim 9, wherein the sensor pod further comprises:
- a fluid port integrated into the exterior surface of the sensor enclosure, wherein the fluid port is configured to be coupled to a fluid port of the AV to facilitate an exchange of at least one of a cooling fluid or a cleaning fluid.

12. The AV of claim 9, wherein the sensor pod further comprises:
- a thermal management module coupled to the plurality of sensors, wherein the thermal management module is configured to provide data to the AV regarding a health status of at least one of the plurality of sensors.

13. The AV of claim 9, wherein the plurality of sensors comprises at least one of a Light Ranging and Detection (LiDAR) sensor, a radio detection and ranging (RADAR) sensor, an acoustic sensor, and a camera.

14. The AV of claim 9, wherein the sensor pod further comprises a sensor articulation component comprising a motor configured to move at least one sensor of the plurality of sensors.

15. A method comprising:
- integrating a plurality of sensors into an interior volume of a sensor enclosure of a sensor pod,
- integrating an aggregated power and data interface port into an exterior surface of the sensor enclosure, wherein the aggregated power and data interface is configured to electrically couple the plurality of sensors to an electrical system of a vehicle, and wherein the aggregated power and data interface comprises a data port that includes integrated power wiring; and
- integrating a plurality of sensor ports into the sensor pod, the plurality of sensor ports configured to connect the plurality of sensors to the aggregated power and data interface and configured to provide modular connectivity to the plurality of sensors such that each sensor within the sensor enclosure is removable and able to be decoupled from the plurality of sensor ports, the plurality of sensor ports also being configured to enable different types or versions of sensors to be swapped between sensor ports.

16. The method of claim 15, further comprising:
- receiving, via a data aggregation component, sensor data from the plurality of sensors; and
- performing one or more operations on the sensor data, the one or more operations comprising at least one of memory queuing and a data framing operation.

17. The method of claim 15, further comprising:
- integrating a first fluid port into the exterior surface of the sensor enclosure, wherein the first fluid port is configured to be coupled to a second fluid port of the vehicle to facilitate an exchange of at least one of a cooling fluid or a cleaning fluid.

18. The method of claim 15, further comprising:
- coupling a thermal management module to the plurality of sensors, wherein the thermal management module is configured to provide data to the vehicle regarding a health status of at least one of the plurality of sensors.

19. The method of claim 15, wherein the vehicle comprises an autonomous vehicle (AV).

20. The sensor pod of claim 15, the method further comprising:
- determining that a sensor of the plurality of sensors has been revised; and
- removing an existing sensor from the sensor pod and modularly installing the revised sensor in the sensor pod.

* * * * *